United States Patent Office 3,621,682
Patented Nov. 23, 1971

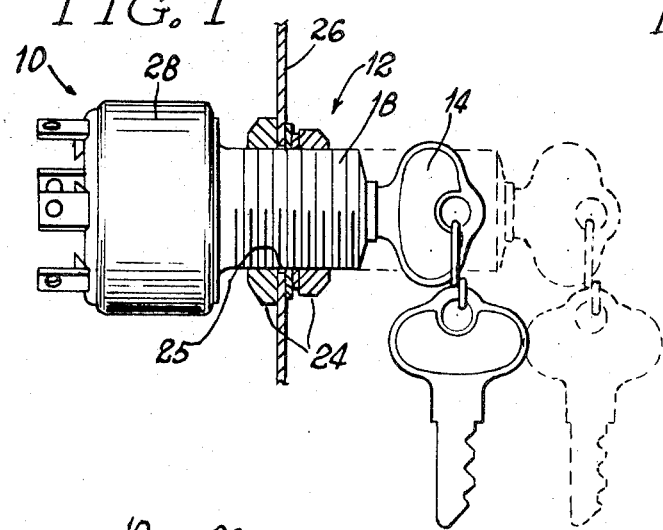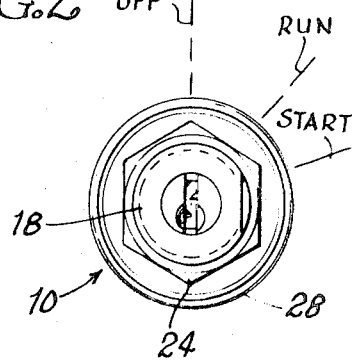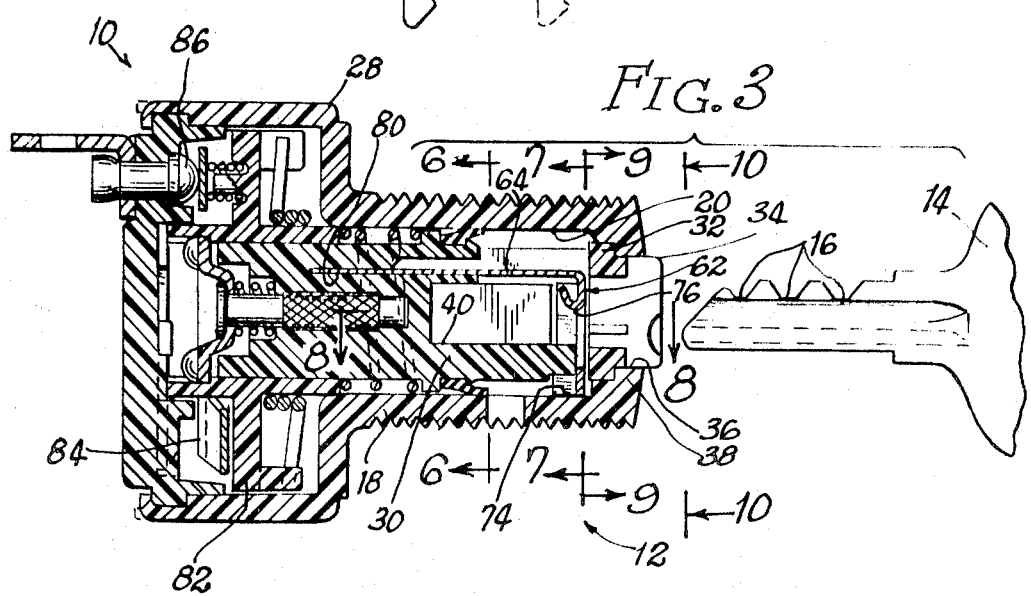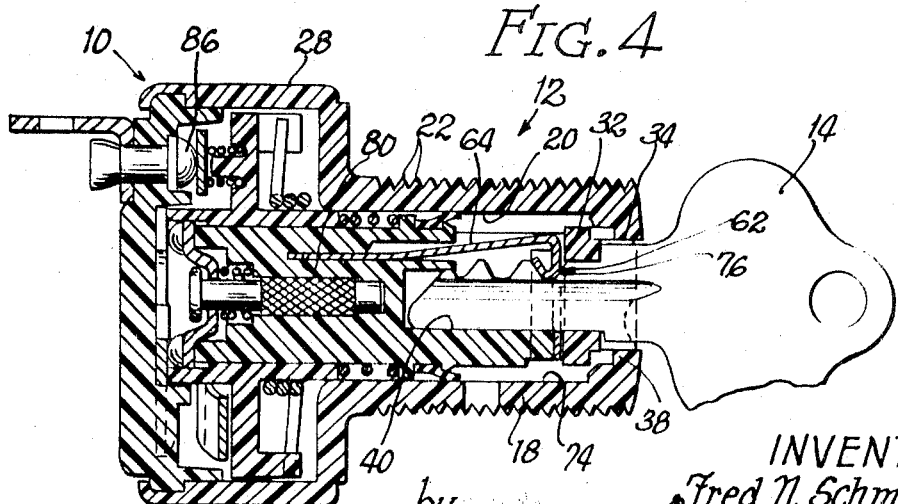
INVENTOR
Fred N. Schmidt
by Burmeister, Palmatier and Hamby
Attys

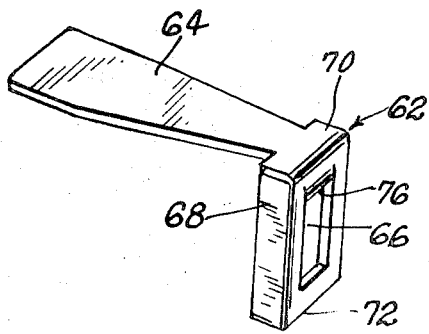
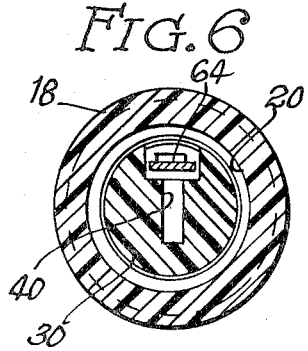
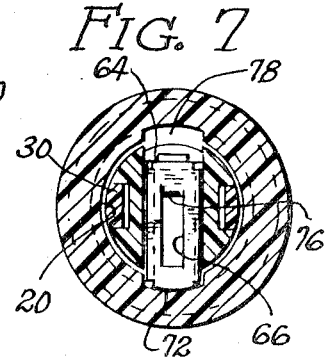
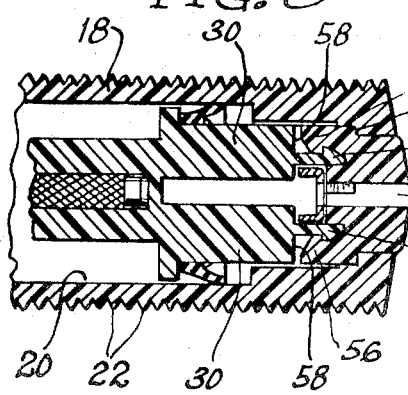
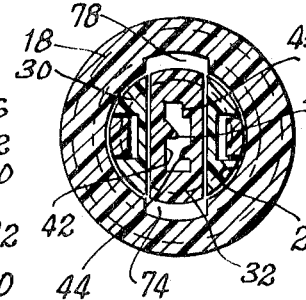
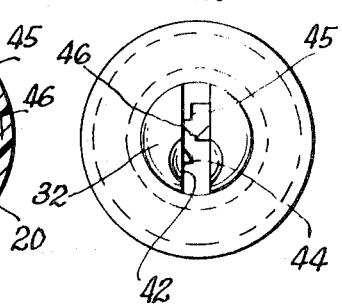
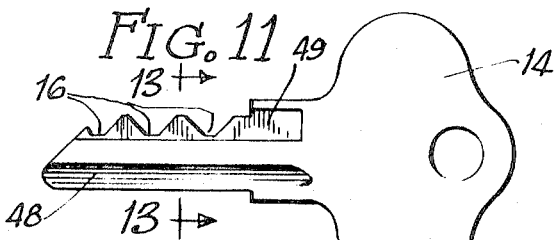
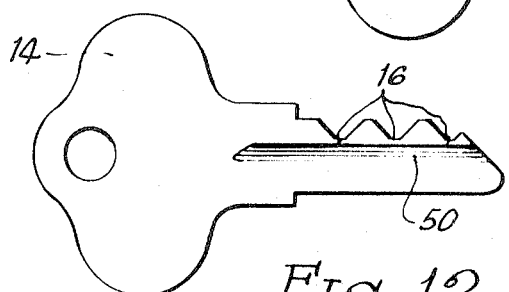
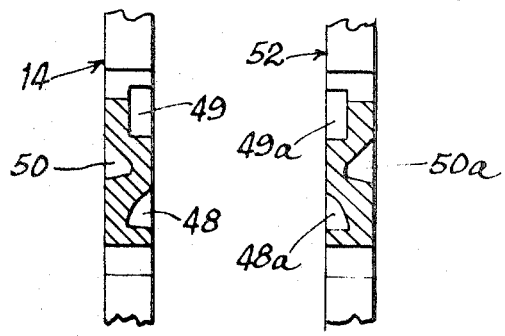

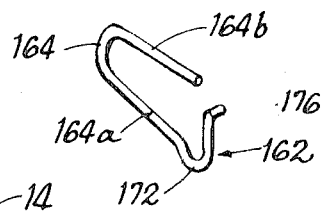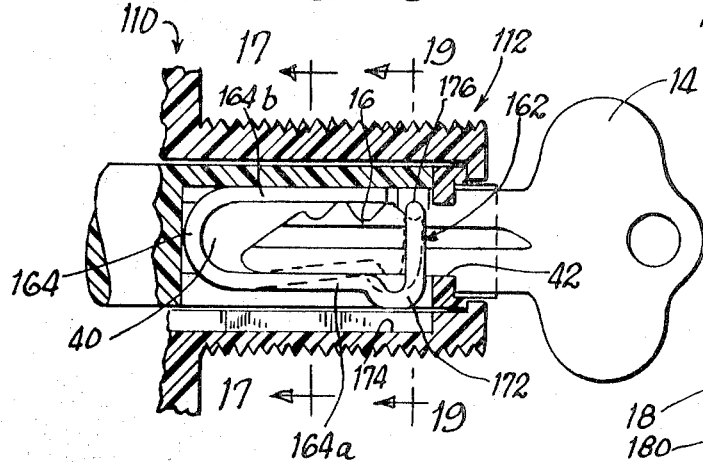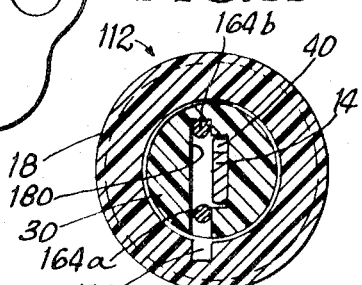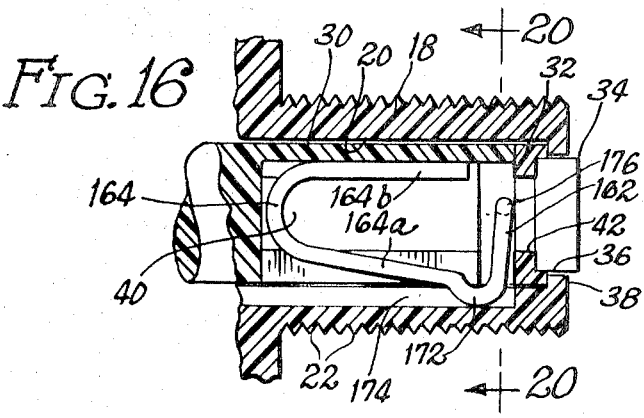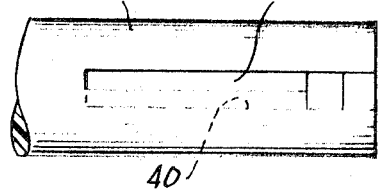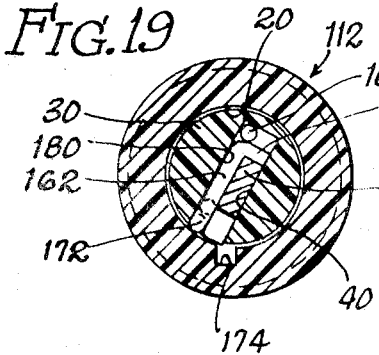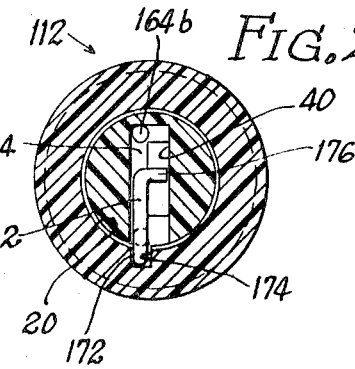

3,621,682
LOCK MECHANISMS FOR SWITCHES OR
THE LIKE
Fred N. Schmidt, Mukwonago, Wis., assignor to Indak
Manufacturing Corp., Northbrook, Ill.
Filed Nov. 17, 1969, Ser. No. 877,285
Int. Cl. E05b 15/14, 29/02
U.S. Cl. 70—364 R         9 Claims

ABSTRACT OF THE DISCLOSURE

Each of the illustrated lock mechanisms comprises a lock barrel or casing having an opening therein for receiving a lock cylinder which is formed with a longitudinal key slot. A combined spring and locking member is mounted in the lock cylinder. In one embodiment, the spring and the lock member are made in one piece from sheet metal. The spring is in the form of a slender spring arm. The locking member is formed with an aperture for receiving the key. The locking member has a key engaging portion at one end of the aperture. A second portion is formed at the other end of the aperture and is adapted to be moved by the spring into a lock recess in the barrel. When a key is inserted, the second portion is moved out of the lock recess so that the cylinder can be turned. In a second embodiment, the spring and the locking member are formed in one piece from wire. The spring is preferably U-shaped. The key engaging portion of the locking member is preferably in the form of a finger bent laterally therefrom. The second portion of the locking member preferably comprises a U-shaped bend formed therein.

This invention relates to lock mechanisms which are particularly applicable to key-operated electrical switches, but will also find various other applications.

In key switches, such as those employed for automotive applications, it has been the usual practice to employ lock mechanisms of the tumbler type. Such lock mechanisms involve the manufacture and assembly of numerous small parts, so that such mechanisms are awkward and relatively expensive to make.

One principal object of the present invention is to provide a new and improved lock mechanism having all the advantages of a tumbler lock, while being extremely easy and inexpensive to make.

In accordance with the present invention, the usual tumblers and tumbler springs are supplanted by a combined spring and locking member which may be made of either sheet metal or wire. The locking member comprises a first portion for engaging the key, and a second portion which is movable into a lock recess in the barrel, so that the cylinder will be locked against rotation when the key is removed. When the key is inserted, it engages the first portion and moves the locking member so as to unlock the cylinder.

In one embodiment of the invention, the spring and the locking member are formed in one piece from sheet metal. The spring is preferably in the form of a slender spring arm. The cylinder is formed with a socket for receiving the free end of the spring arm. The locking member is formed with an aperture to receive the key. The first and second portions are formed at opposite ends of the aperture. Preferably, the locking member is channel-shaped.

In another embodiment, the spring and the locking member are formed in one piece of wire. The spring is preferably U-shaped. The key-engaging portion of the locking member is in the form of a finger bent laterally from the locking member. The second portion of the locking member is preferably in the form of a U-shaped bend therein. The bend is adapted to move into the lock recess when the key is removed. When the key is inserted, it engages the finger and causes the U-shaped bend to move out of the lock recess.

The lock cylinder is preferably made with a front piece which may be formed with key slots of various shapes, each of which is capable of receiving a key of a corresponding shape. By thus providing for a series of different keys, the security of the lock is enhanced.

Further objects, advantages and features of the present invention will appear from the following description, taken with the accompanying drawings, in which:

FIG. 1 is a side elevation of a key switch which incorporates a lock mechanism to be described as an illustrative embodiment of the present invention.

FIG. 2 is a front elevation of the key switch.

FIG. 3 is a longitudinal section taken through the key switch of FIG. 1.

FIG. 4 is a view similar to FIG. 3, but with the key inserted into the lock.

FIG. 5 is a perspective view of the combined spring and locking member, employed in the lock mechanism of FIGS. 1-4.

FIGS. 6 and 7 are cross-sectional views taken along the lines 6—6 and 7—7 in FIG. 3.

FIG. 8 is a fragmentary longitudinal section, taken generally along the line 8—8 in FIG. 3.

FIG. 9 is a cross-sectional view, taken generally along the line 9—9 in FIG. 3.

FIG. 10 is a fragmentary enlarged front view, taken generally as indicated by the line 10—10 in FIG. 3.

FIGS. 11 and 12 are opposite side views of a key for the lock mechanism.

FIG. 13 is a cross-section taken through the key, generally along the line 13—13 in FIG. 11.

FIG. 14 is a view similar to FIG. 13 but showing a modified construction.

FIG. 15 is a longitudinal section showing another embodiment of the lock mechanism.

FIG. 16 is a view similar to FIG. 15, but with the key removed.

FIG. 17 is a cross-section, taken generally along the line 17—17 in FIG. 15.

FIG. 18 is a fragmentary bottom view showing the lock cylinder as employed in the lock mechanism of FIG. 15.

FIG. 19 is a cross-section taken generally along the line 19—19 in FIG. 15.

FIG. 20 is a cross-section taken generally along the line 20—20 in FIG. 16.

FIG. 21 is a perspective view showing the combined spring and locking member as employed in the lock mechanism of FIGS. 15-20.

As just indicated, FIGS. 1-5 illustrate a key-type electrical switch 10, which is particularly well adaped for use in automotive applications, as an ignition switch or the like. The illustrated switch 10 is inexpensive in construction and is especially well adapted for use as the ignition switch for a motor boat or a farm tractor. Those skilled in the art will find other applications for the switch 10.

It will be seen that the switch 10 incorporates a lock mechanism 12, adapted to be operated by a key 14 which may be of the same type employed in conventional tumbler type locks. It will be seen from FIG. 3 that the key 14 is formed with three notches 16, but only one of them is used, as is often the case with inexpensive locks.

As indicated in FIG. 2, the key 14 may be turned so that it occupies any one of the three positions, designated "Off," "Run" and "Start" In the "Start" position, the starter motor is energized so as to turn over the motor.

In addition, the key 14 may be pushed rearwardly so as to energize an electrically operated choke control. This feature is especially valuable when the switch is employed in connection with a boat motor. Various features of the switch are disclosed and claimed in the copending application of William J. Schaad and Fred N. Schmidt, Ser. No. 879,690, filed Nov. 25, 1969.

The lock mechanism 12 comprises a barrel or casing 18 with a cylindrical opening 20 therein. The illustrated barrel 18 is made of a plastic material, but metal or other suitable materials may be employed. In this case, the outside of the barrel 18 is formed with screw threads 22, adapted to receive one or more nuts 24 which may be employed to secure the barrel 18 within an opening 25 in a supporting panel 26. As illustrated, the switch 10 has a housing 28 which is formed integrally with the barrel 18. However, various other constructions may be employed.

The lock mechanism 12 comprises a lock cylinder 30 which is rotatable within the opening 20 formed in the barrel 18. In this case, the cylinder 30 is also made of a plastic material, but may be made of metal or other suitable materials.

The rotatable lock cylinder 30 is preferably formed with a front member 32 which is assembled as a separate piece, so as to facilitate the manufacture of the lock mechanism 12, while providing enhanced security, in that a series of different front members may be employed, to receive different keys. As shown, the front member 32 has a reduced nose portion 34 which extends forwardly through an opening 36 in a flange portion 38, projecting inwardly from the barrel 18.

The lock cylinder 30 is formed with a longitudinal key slot 40. A slot 42 also extends through the front member 32, as shown to best advantage in FIG. 10. The shape of the slot 42 can be varied by providing a series of front members, formed with key slots of various shapes. In this way, a series of different keys will be necessary to operate the various switches. It will be seen from FIG. 10 that various ridges or splines 44, 45 and 46 may be arranged to project into the key slot 42. The key 14 has corresponding grooves 48, 49 and 50 milled or otherwise formed therein. By varying the arrangement of the splines 44, 45 and 46, a series of key switches will be produced, requiring different keys for operation.

Two such variations are shown in FIGS. 13 and 14, which are cross-sections of different keys. FIG. 13 shows the cross-section of the key 14, as illustrated in FIGS. 11 and 12. On the other hand, FIG. 14 shows a modified key 52 in which the profile has been reversed from left to right. Thus, the key 52 has grooves 48a, 49a, and 50a which are reversed in position on the key, relative to the corresponding grooves 48, 49 and 50, as shown in FIG. 13.

The front member 32 is constructed so that it can easily be snapped into its position on the rotatable lock cylinder 30. Thus, the front member 32 comprises a pair of lugs or fingers 56 which project rearwardly in recesses or slots 58, formed in a front portion of the rotatable lock cylinder 30, as shown to best advantage in FIG. 8. The lugs 56 are adapted to snap behind a pair of complementary lugs or fingers 60 which project forwardly and outwardly from the lock cylinder 30. It is easy to assemble the front member 32 on the lock cylinder 30 simply by pushing the front member 32 rearwardly. The lugs 56 and 60 are sufficiently resilient to permit the lugs 56 to snap behind the lugs 60. This arrangement makes it possible to standardize the rotatable lock cylinder 30 while providing a series of front members 32 having different key slots 42.

As shown to good advantage in FIGS. 3 and 4, the key 14 is adapted to engage a locking member 62, movably mounted in the key slot 40 within the rotatable lock cylinder 30. A spring 64 is formed in one piece with the locking member 62. In this case, the locking member 62 and the spring 64 are made of sheet metal but other suitable materials may be employed.

As shown to best advantage in FIG. 5, the lock member 62 is preferably formed with a key slot or aperture 66. Side flanges 68 and 70 are preferably formed on the locking member 62 so that it is generally channel-shaped. The flanges 68 and 70 increases the strength and rigidity of the locking member 62. The spring 64 is generally in the form of a slender arm or leaf bent rearwardly from the locking member 62.

As shown in FIGS. 3 and 4, the locking member 62 is slidable transversely within the key slot 40 in the lock cylinder 30. One end portion 72 of the locking member 62 is movable into a lock recess or slot 74, formed in the barrel 18. When the end portion 72 is in the lock recess 74, the cylinder 30 is locked against rotation.

The key 14 is adapted to engage a portion 76 of the locking member 62 at the opposite end of the aperture from the end portion 72. The portion 76 is curled or rounded inwardly and is adapted to engage the notches 16 in the key 14, as shown in FIG. 4. It will be evident that the key 14 displaces the locking member 62 in such a manner that the locking portion 72 is moved out of this lock recess. Thus, the lock cylinder 30 is released so that it can be turned by the key 14.

As shown in FIG. 7, the barrel 18 is formed with another recess 78, similar to the lock recess 74, but diametrically opposite therefrom. The recess 78 is adapted to accommodate the upward and downward movement of the locking member 62, produced by the insertion of the key 14. When the lock cylinder 30 is rotated from its initial position, the recess 78 is no longer opposite the key slot 40, with the result that the locking member 62 is restrained against movement to such an extent that the key 14 is positively retained in the lock so that the key cannot be removed when the switch is in its "Run" and "Start" positions.

Initially, the spring 64 extends generally at right angles to the locking member 62, and generally parallel to the axis of the rotatable lock cylinder 30. The rear end of the spring 64 is mounted and retained in the lock cylinder 30. Thus, as shown to best advantage in FIGS. 3 and 4, the illustrated spring 64 is inserted into a socket or slot 80. The spring 64 fits snugly in the socket 80 so that the spring will be securely retained in the slot, even when the spring is flexed by the insertion of the key 14, as shown in FIG. 4.

The rotatable lock cylinder 30 is connected to a rotatable carriage 82 which supports at least one contractor 84, adapted to engage a plurality of fixed contact points 86. Additional details and features of the switch are disclosed and claimed in the above-mentioned copending application.

When the key 14 is removed from the lock, as shown in FIG. 3, the end portion 72 of the locking member 62 projects from the cylinder 30, into the lock recess 74 in the barrel 18. Thus, the cylinder 30 is locked against rotation. The spring 64 biases the locking member 62 into its locking position.

When the key 14 is inserted, it engages the rounded unlocking element 76, which is displaced upwardly, as shown in FIG. 4, so that the spring 64 is flexed. In this way, the end portion 72 of the locking member 62 is withdrawn from the lock recess 74. Thus, the rotatable cylinder 30 is released or unlocked, for turning movement by the key 14.

Because of the integral construction of the locking member 62 and the spring 64, the lock mechanism is very inexpensive and easy to assemble. The thin slender spring 64, extending rearwardly from the locking member 62, takes up very little room and is so rugged that it should last indefinitely.

FIGS. 15–20 illustrate a modified key-type electrical switch 110, which incorporates a modified lock mechanism 112, constituting another embodiment of the present invention. In most respects, the modified lock mechanism 112 is the same as the mechanism 12, already described. To the extent that the lock mechanisms are the same, the corresponding elements of the lock mechanism 112 have been given the same reference characters, as in the case of the mechanism 12. In this way, unnecessary duplication of description will be avoided. Thus, the following description will be confined to the differences between the two lock mechanisms 12 and 112.

In the lock mechanism 112, the sheet metal elements 62 and 64 are replaced by a combined locking member 162 and spring 164, preferably formed in one piece from metal spring wire. However, various other materials may be employed.

In this case, the spring 164 is preferably U-shaped and is formed with legs 164a and 164b. The locking member 162 is formed integrally with the leg 164a in this instance. In general, the locking member 162 extends transversely in the rotatable cylinder 30 and occupies a position along one side of the key 14 when it is inserted into the slots 40 and 42. At one end, the locking member is formed with a projecting portion 172, adapted to be received in a lock recess or slot 174 formed in the barrel 18. As shown, the projecting portion 172 is in the form of a generally U-shaped bend, extending between the locking member 162 and the lower leg 164a of the U-shaped spring 164.

At the end opposite from the projecting portion 172, the locking member 162 is formed with an unlocking finger or ear 176, preferably bent laterally from the locking member 162. The unlocking finger 176 is adapted to engage the notch portions 16 of the key 14.

The spring 164 is seated in a spring slot 180 which is formed in the rotatable cylinder 30 alongside the key slot 40. It is an easy matter to insert the spring 164 into the spring slot 180 when the lock is assembled.

When the key 14 is withdrawn from the lock, the U-shaped portion 172 is located in the lock recess 174, as shown in FIG. 16, so that the lock cylinder 30 is locked against rotation when the key 14 is inserted. As shown in FIG. 15, the finger 176 is displaced upwardly by the key. With the key 14 fully inserted, the finger 176 occupies one of the notches 16 in the key. The U-shaped locking portion 172 is withdrawn from the lock recess 174 so that the cylinder 30 can be rotated, as shown in FIG. 19.

It will be recognized that it is very easy and inexpensive to make the combined locking member 162 and spring 164. Moreover, the assembly of the lock mechanism may be accomplished very easily and inexpensively.

I claim:
1. A lock mechanism,
comprising a lock barrel having a generally cylindrical opening therein,
a lock cylinder rotatably mounted in said opening,
said lock cylinder having a key slot therein extending generally parallel to the rotary axis thereof for receiving a key,
said barrel having a lock recess therein,
a slender flexible spring arm having one end mounted in said lock cylinder,
said spring arm extending in said lock cylinder generally parallel to the axis thereof,
and a locking member formed integrally with the opposite end of said spring arm and extending therefrom transversely thereto,
said lock cylinder having openings therein receiving said locking member and said spring arm for transverse movement relative to said key slot,
said locking member having a first portion initially positioned in said lock recess to prevent rotation of said cylinder in said barrel,
said locking member having a second portion initially projecting into said key slot and engageable by the key,
said locking member being movable transversely by the key against the biasing action of the spring arm so as to withdraw the first portion from the lock recess,
the lock cylinder thereby being released for rotation in the lock barrel by the key.

2. A lock mechanism according to claim 1,
in which said spring arm and said locking member are made of sheet metal.

3. A lock mechanism according to claim 1,
in which said spring arm is essentially straight in its initial position.

4. A lock mechanism according to claim 1,
in which said lock cylinder is formed with a socket for receiving said one end of said spring arm.

5. A lock mechanism according to claim 1,
in which said locking member is formed with an aperture for receiving the key.

6. A lock mechanism according to claim 1,
in which said first and second portions of said locking member are at opposite ends of said aperture.

7. A lock mechanism according to claim 1,
in which said spring arm and said locking member are made of sheet metal,
said locking member being formed with an aperture for receiving the key,
said first and second portions of said locking member being at opposite ends of said aperture.

8. A lock mechanism according to claim 1,
in which said spring arm and said locking member are made in one piece of sheet metal,
said locking member being generally channel shaped.

9. A locking mechanism according to claim 1,
in which said locking member extends generally at right angles to said spring arm.

References Cited
UNITED STATES PATENTS

| | | | |
|---|---|---|---|
| 1,664,404 | 4/1928 | Douglas | 70—364 |
| 1,941,932 | 1/1934 | Deutsch | 70—453 |
| 2,206,539 | 7/1940 | Swanson | 70—364 |
| 3,216,230 | 11/1965 | Falk | 70—421 |

ROBERT L. WOLFE, Primary Examiner

U.S. Cl. X.R.

70—377